(12) United States Patent
Morea et al.

(10) Patent No.: US 9,647,963 B2
(45) Date of Patent: May 9, 2017

(54) METHOD FOR CONTROLLING THE ESTABLISHMENT OF A CONNECTION WITHIN A TRANSPORT NETWORK

(75) Inventors: Annalisa Morea, Nozay (FR);
Dominique Verchere, Nozay (FR);
Martin Vigoureux, Nozay (FR);
Richard Douville, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 888 days.

(21) Appl. No.: 13/580,425

(22) PCT Filed: Feb. 25, 2011

(86) PCT No.: PCT/EP2011/052793
§ 371 (c)(1),
(2), (4) Date: Sep. 19, 2012

(87) PCT Pub. No.: WO2011/120743
PCT Pub. Date: Oct. 6, 2011

(65) Prior Publication Data
US 2013/0011137 A1   Jan. 10, 2013

(30) Foreign Application Priority Data
Mar. 31, 2010 (FR) .................... 10 52424

(51) Int. Cl.
*H04L 12/937* (2013.01)
(52) U.S. Cl.
CPC .................... *H04L 49/253* (2013.01)

(58) Field of Classification Search
CPC ..................................... H04L 49/253
USPC ....................... 370/369, 231, 431
See application file for complete search history.

(56) References Cited

U.S. PATENT DOCUMENTS

| 7,315,510 B1* | 1/2008 | Owens et al. ............... 370/218 |
| 2004/0022247 A1 | 2/2004 | Chen et al. |
| 2006/0072471 A1* | 4/2006 | Shiozawa ..................... 370/248 |

FOREIGN PATENT DOCUMENTS

WO    2005053333    6/2005

* cited by examiner

*Primary Examiner* — Mohammad Anwar
(74) *Attorney, Agent, or Firm* — Patti & Malvone Law Group, LLC

(57) ABSTRACT

A method for controlling the establishment of a connection with a transport network, said message consisting of extracting from a first signaling message a piece of switching status information for a transport switch of said node, configuring said transport switch within said switching status (65), estimating (64) a piece of time information regarding the configuration of said transport switch and generating a second signaling message intended for a network element of said transport network, said second signaling message comprising a piece of time information for determining a configuration end date of said transport switch. Said second signaling message may be transmitted without waiting for the end of communication of said transport switch. A controller is also described.

15 Claims, 8 Drawing Sheets

METHOD FOR CONTROLLING THE ESTABLISHMENT OF A CONNECTION WITHIN A TRANSPORT NETWORK

The invention pertains to the field of telecommunications networks. More specifically, the invention pertains to a signaling method for establishing a transport connection between nodes of such a network.

BACKGROUND

Types of messages used to establish connections within a transport network have often been standardized for the purposes of enabling interoperability between equipment of diverse origins, between the different management domains, or between different operators. Thus, the standards organization IETF regularly publishes RFCs (Request for comments) regarding the standardization of signaling for establishing connections within a transport network. Many types of transport networks are known. For example, among known transport networks are those using layer-1 switching like TDM, WDM or Lambda or wavelength bands, or Fiber or physical Ethernet ports or other layer-1 protocols; layer-2 switching like Ethernet frame switching, ATM, Frame Relay or other layer-2 protocols; and layer-3 switching like IP packet switching, IP/MPLS labeled packet switching, or other layer-3 protocols. As an additional example, one may also refer to GMPLS (Generalized Multiprotocol Label Switching) architecture, to RFCs 3471 and 3472, and also to RFC 3473 regarding the RSVP-TE (for Resource Reservation Protocol—Traffic Engineering) protocol.

SUMMARY

According to one embodiment, the invention provides a method for controlling the establishment of a connection with the transport network, said method comprising receiving within a first node of said network located along a path of said connection, a first signaling message for establishing said connection for the transport of an optical signal within said optical transport network, processing said signaling message to extract from it the information needed to identify a switching state for a transport switch of said first node, ordering said transport switch to configure said transport switch in said switching state, estimating a first piece of time information regarding the configuration of said transport switch, generating a second signaling message, said second signaling message comprising said first time information for enabling a second node of the network to determine a configuration end date of said transport switch, and transmitting said second signaling message to said second node of said transport network.

Said transport switch of said method may use a layer-1 or layer-2 or layer-3 switching technology.

Advantageously, the method is such that said second network node is a node adjacent to said first node on the path of said connection or an end node along the path of said connection or a network management element.

The method may also be such that said first signaling message further contains a second piece of time information enabling a controller of the first node to determine a configuration end date of a transport switch located within a third node located along the path of said connection.

The method may further be such that said second signaling message is generated so as to comprise said second time information.

The method may further comprise the step of comparing said first and second time information and to insert into said second signaling message, instead of the first time information, whichever of said first and second time information corresponds to whichever of said switches which has the latest switching end date.

The method may advantageously be such that said signaling control messages are RSVP-TE messages.

The invention also provides a controller for a node of a communication network located along the path of a connection, said controller being capable of receiving within a first node of said network located along a path of said connection, a first signaling message for establishing said connection for the transport of an optical signal within said optical transport network, processing said signaling message to extract from it the information needed to identify a switching state for a transport switch of said first node, ordering said transport switch to configure said transport switch in said switching state, estimating a first piece of time information regarding the configuration of said transport switch, generating a second signaling message, said second signaling message comprising said first time information for enabling a second node of the network to determine a configuration end date of said transport switch, and transmitting said second signaling message to said second node of said transport network.

Said transport switch ordered by said controller may use a layer-1 or layer-2 or layer-3 switching technology.

The controller may be such that said first time information comprises said configuration end date of said transport network's switch.

The controller may also be such that said controller is capable of transmitting said second message without waiting for the end of said switch's switching.

Advantageously, the controller is capable of determining a configuration end date of a second transport switch located within another node located on the path of said connection, based on said second time information contained within said first signaling message.

The controller may also be capable of generating said second signaling message such that it also comprises said second time information.

The controller may be capable of comparing said first and second time information and inserting into said second signaling message, instead of the first time information, whichever of said first and second time information corresponds to whichever of said switches which has the latest switching end date.

The controller may be arranged such that said signaling control messages are RSVP-TE-type messages.

One problem at the basis of the invention is defining a signaling protocol that enables the fast establishment of a connection between remote nodes of a transport network. It has been observed that the configuration time of the nodes' switches that are to contribute to a connection may take several minutes. A signaling protocol is desired that makes it possible to reduce the time taken to establish the end-to-end connection between end-point nodes.

One idea at the basis of the invention is limiting the negative effect of the long configuration durations of the switches located within each of the nodes that are to participate in a connection.

Some aspects of the invention also arise from the observation that the choice of the network's nodes that will confirm the establishment of a new connection between two remote nodes is a choice that can be optimized. In particular, this choice may be made wisely to reduce the impact of the configuration duration of the switches located within each of the connection's nodes.

In particular, it has been observed that the confirmation of the end-to-end connection's establishment may be a responsibility distributed among several nodes of the network or conversely, a responsibility belonging to a single node called the master node.

Analyses have shown that the fastest connection is obtained by allowing one node in particular to judge whether the end-to-end connection is actually established. Some aspects of the invention are based on the idea of providing such a particular node with information enabling it to deduce the switching end moment of other nodes' switches.

Another idea at the basis of the invention is that it is advantageous for this information to be provided, without it being necessary that these other nodes wait for switching to actually end among the switches they contain for them to provide information.

BRIEF DESCRIPTION OF DRAWINGS

The invention will be better understood, and other purposes, details, characteristics, and advantages thereof will become more clearly apparent upon examining the following description of multiple particular embodiments of the invention, which are given only by way of illustrative and non-limiting examples, with reference to the attached drawings.

In these drawings.

DETAILED DESCRIPTION

Here, the term "network node" refers to any equipment connected to the network. For example, this includes hardware or software elements contributing to the switching of signals over to the network's branches, as well as hardware or software elements which are not necessarily located at a branch of the network but which contribute to the network's operation, for example a network manager.

Here, "path of the connection" refers to all of the links and nodes used to establish and maintain an end-to-end connection.

Figure 1:
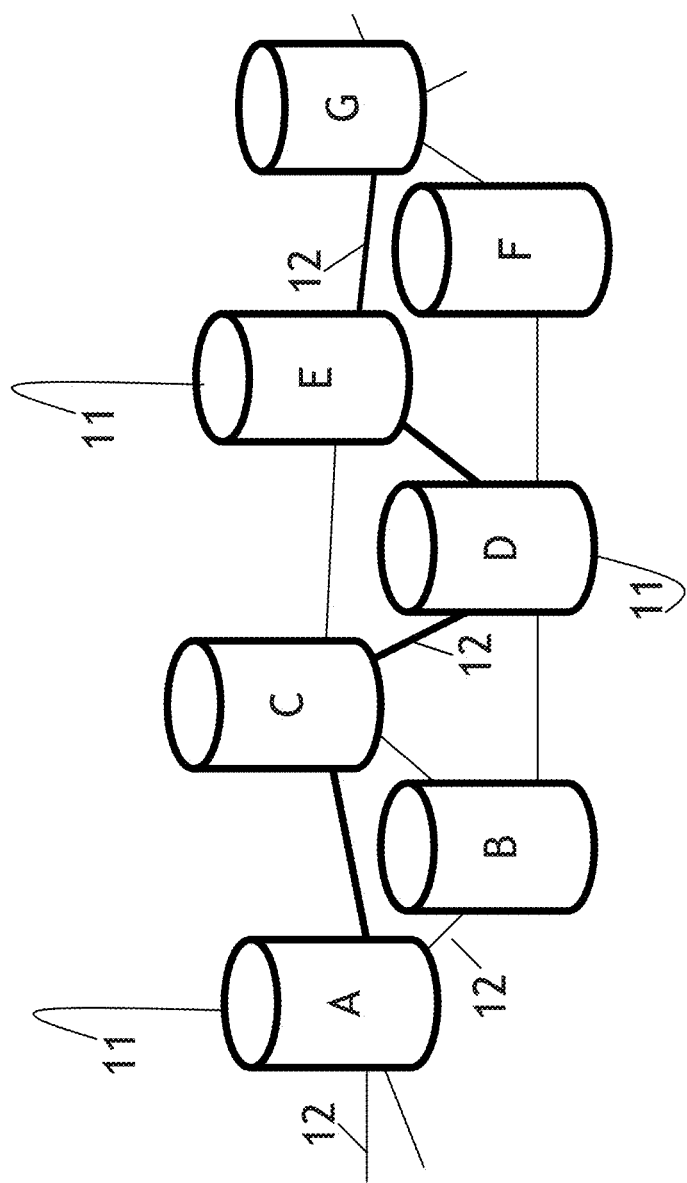
FIG. 1 is a schematic depiction of transport nodes within a transport network.

FIG. 1 schematically depicts a communication network comprising nodes 11 located at the branches of the transport links 12 made up by single-mode optical fibers. The links 12 carry optical signals on wavelength channels of a WDM spectrum. These signals may be signals at 10 Gbit/s bit rates or other bit rates or a mixture of bit rates. The detection of these signals may be a direct detection or a coherent detection or a mixture of these two types of detection. In FIG. 1, the depicted nodes 11 have been named A, B, C, D, E, F, G for clarity's sake and to enable the connection with FIGS. 3 and 4.

The embodiment described below concerns the establishment of a connection between the nodes A and G of FIG. 1, this connection potentially involving, besides nodes A and G, all or some of nodes B, C, D, E, and F. By way of illustration, it will hereafter be assumed that the connection to be established is a connection that does not involve nodes B and F. In this connection, node A is linked to node C, node C is linked to node D, node D is linked to node E and node E is linked to node G. Such a connection shall be called ACDEG here, with this appellation including the letters identifying the successive nodes it involves. The path of the ACDEG connection includes all the links AC, CD, DE, and EG, as well as the nodes A, C, D, E and G.

The ACDEG connection may be a first connection established within the network so as to transmit the data traffic from node A to node G. The ACDEG connection may also be a connection protecting a pre-existing ABDFG connection that had failed, such as due to the fiber 12 linking the nodes A and B breaking. The ACDEG connection may also be a connection that had been restored after it had failed and been temporarily replaced by a connection ABDFG, for the time taken to repair ACDEG connection. The ACDEG connection may have other functions in the network of FIG. 1.

Figure 2:
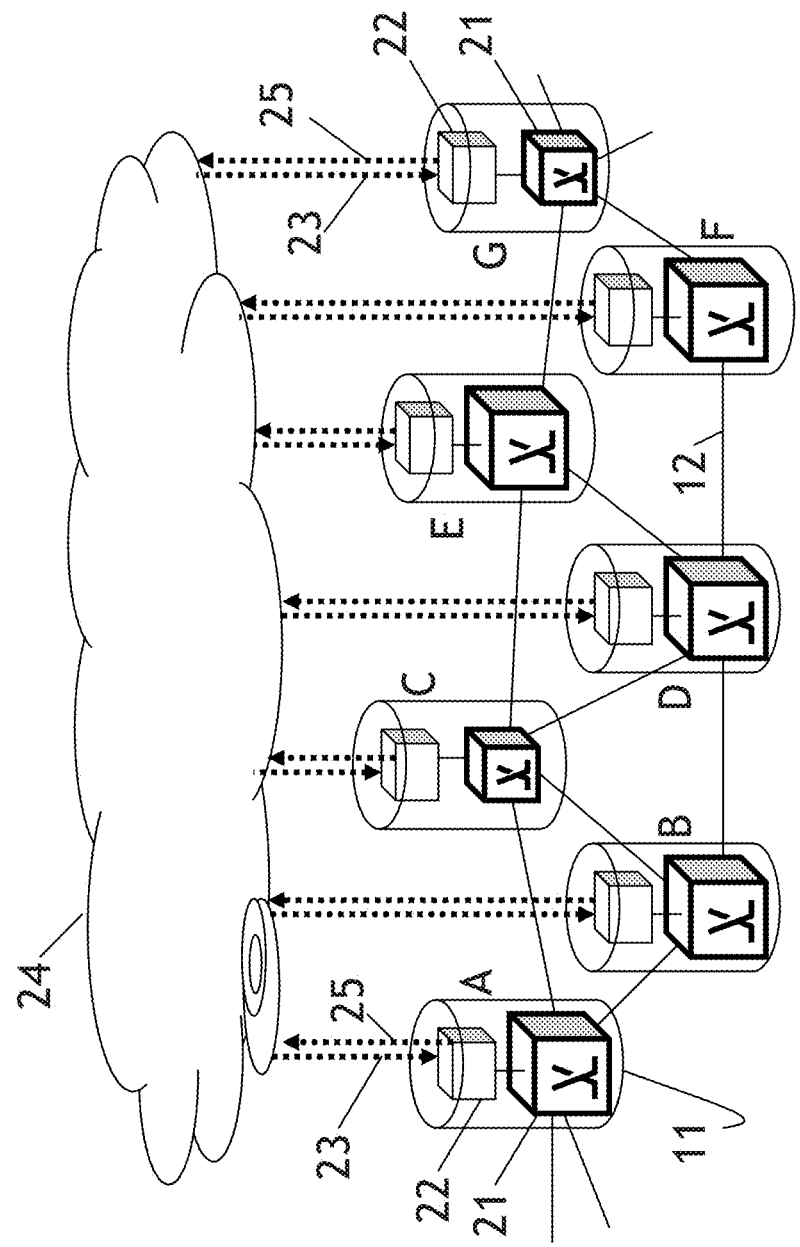
FIG. 2 is a more detailed schematic depiction of FIG. 1, showing components for the signaling of a connection within a transport network.

FIG. 2 schematically depicts elements making it possible to establish ACDEG connection described with reference to FIG. 1. Each of the nodes A, C, D, E, and G comprise a transport switch 21 and a controller 22. Each of the nodes B and F also comprise a switch 21 and a controller 22, but they do not take part in establishing the ACDEG connection. The controllers 22 receive signaling messages 23 from the cloud 24 and transmit signaling messages 25 to the signaling network depicted in the shape of a cloud 24. The cloud 24 is, for example, a client IP network of the transport network, or the control network of the transport network. The cloud 24 exchanges control messages, and particularly signaling messages with the controllers 22 of the transport nodes 11. The switches 21 and the controllers 22, the messages 23 and 25 and the cloud 24 may implement hardware elements, software elements, a mixture of these elements, or even other elements.

Here, the term "transport switch" 21 refers to a device that may switch between at least two states, one of these states being adapted to establish the ACDEG connection in question. A layer-1 transport switch may, for example, be a space-division switch, a wavelength converter, an optical frequency translator, a tunable optical delay line, or other types of transmission devices of a transport network. A layer-2 switch may, for example, be an Ethernet switch or frame relay switch. A layer-3 switch may, for example, be an IP router, which may, for example, use label switching. A transport switch has N inputs and P outputs, N and P being natural whole numbers, where $P \geq 2$.

If the transport switch is a spatial optical switch, a switch state is defined by a pair of input and output ports that it links. If the transport switch is a wavelength converter optical switch, a state is defined by one wavelength channel from among N input channels and one wavelength channel from among P output channels. If the transport switch is a frequency translator optical switch, a state is defined by one optical frequency among N input frequencies and one optical frequency among P output frequencies. If the transport switch is an optical switch with variable optical delay lines, a state is defined by a time gap between an input date of a signal from one of N optical inputs and an output date of that signal from one of P optical outputs. Other types of optical and electronic transport switches exist.

For the purpose of establishing the ACDEG transport connection, a controller 22 orders the configuration of a corresponding switch 21. FIG. 11, depicts, for simplicity's sake, nodes 11 each containing a controller 22 and a switch 21. However, the physical distance separating a controller 22 from a switch 21 is unimportant. Likewise, the link between a controller 22 and a switch 21 may be provided in numerous ways; it may, for example, be wired or wireless connections, such as radio or optical connections, or even other types of links. Although FIG. 2 shows a controller associated with each switch 21, a controller 22 may also control a plurality of switches 21. For clarity's sake, we will hereafter assume that a single controller 22 is associated with a single switch 21.

A controller 22 orders a corresponding switch 21, depending on the switching state required for that switch, in order to establish the connection in question. This required switching state is indicated to the controller 22 by means of a signaling message 23 that it receives from a network manager or from a border node of a client network 24 of the transport network.

The network manager may be located in any spot within the network, including within a node not involved in the ACDEG connection. The connection request and the confirmation of the ACDEG connection's establishment may also take place in different locations of the network. A large variety of signaling protocols may be used to enable the nodes 11 to exchange signaling messages 23 and 25. Examples of signaling protocols that may be used for reserving transport network resources are RSVP-TE (IETF RFC 3209, 3473), CR-LDP (IETF RFC 3209, 3472), SNMP (IETF RFC 2571), and SIP (IETF RFC 3261).

However, for simplicity's sake, we will assume that the network manager and the controller 22 are located within node A. Node A is therefore the master node for establishing the ACDEG connection. Nodes C, D, E and G are slave nodes for establishing this connection. In FIGS. 1 and 2, in the embodiment presented, the controller 22 of node A is both in charge of initiating the connection request ACDEG and of confirming the moment when that connection is actually established end-to-end and when it may thereby allow through data traffic coming from a network client over the ACDEG connection, from node A to node G. We will also assume that the signaling protocol used is the RSVP-TE protocol as standardized by the standards organization IETF. According to this protocol, the node A initiates an RSVP-TE PATH signaling message to the node C to establish the path ACDEG. This path is indicated by an explicit route object (ERO) transported in the body of the RSVP-TE PATH message connection establishment request messages. The controller 22 of node C propagates the RSVP-TE PATH message to the controller 22 of the node D, and so on to node G. The controller 22 of node G sends back to the controller 22 of the node A, via the controllers 22 of nodes E, D, and C, an RSVP-TE RESV path reservation acceptance message When the controller 22 of node A receives the RSVP-TE message, it confirms the establishment of the ACDEG connection. The node A may optionally confirm the establishment of the connection by sending a RSVP-TE RESV-CONF message to the nodes CDEG along the connection.

Figure 3:
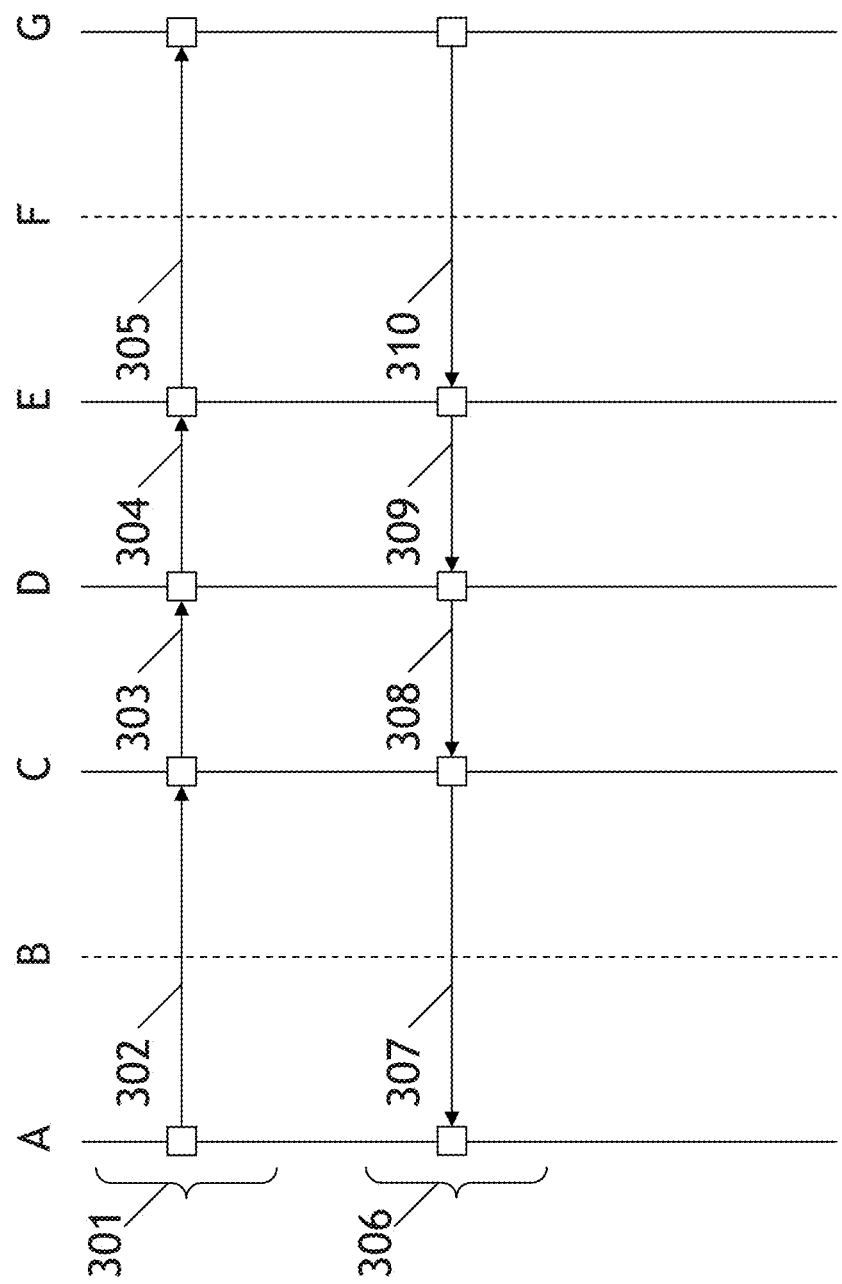
FIG. 3 is a schematic depiction of a node-to-node propagation of RSVP-TE signaling messages.

FIG. 3 schematically depicts as 301 the distribution of RSVP-TE PATH signaling messages from node A to node G via nodes C, D, and E. Numbers 302, 303, 304, and 305 indicate the messages respectively received by the nodes C, D, E, and G from nodes A, C, D, and E. Likewise, we have depicted as 306 the distribution of RSVP-TE RESV signaling messages from node G to node A. Numbers 307, 308, 309 and 310 indicate the messages respectively received by the nodes A, C, D, and E from nodes C, D, E, and G. Here, the term "RSVP-TE-type message" refers to a signaling message which, as is the case for a RSVP-TE message, is transmitted node-to-node from one end of a connection to the other, and in either direction of transmission along the connection. An RSVP-TE message is an example of a RSVP-TE-type message.

Figure 4:
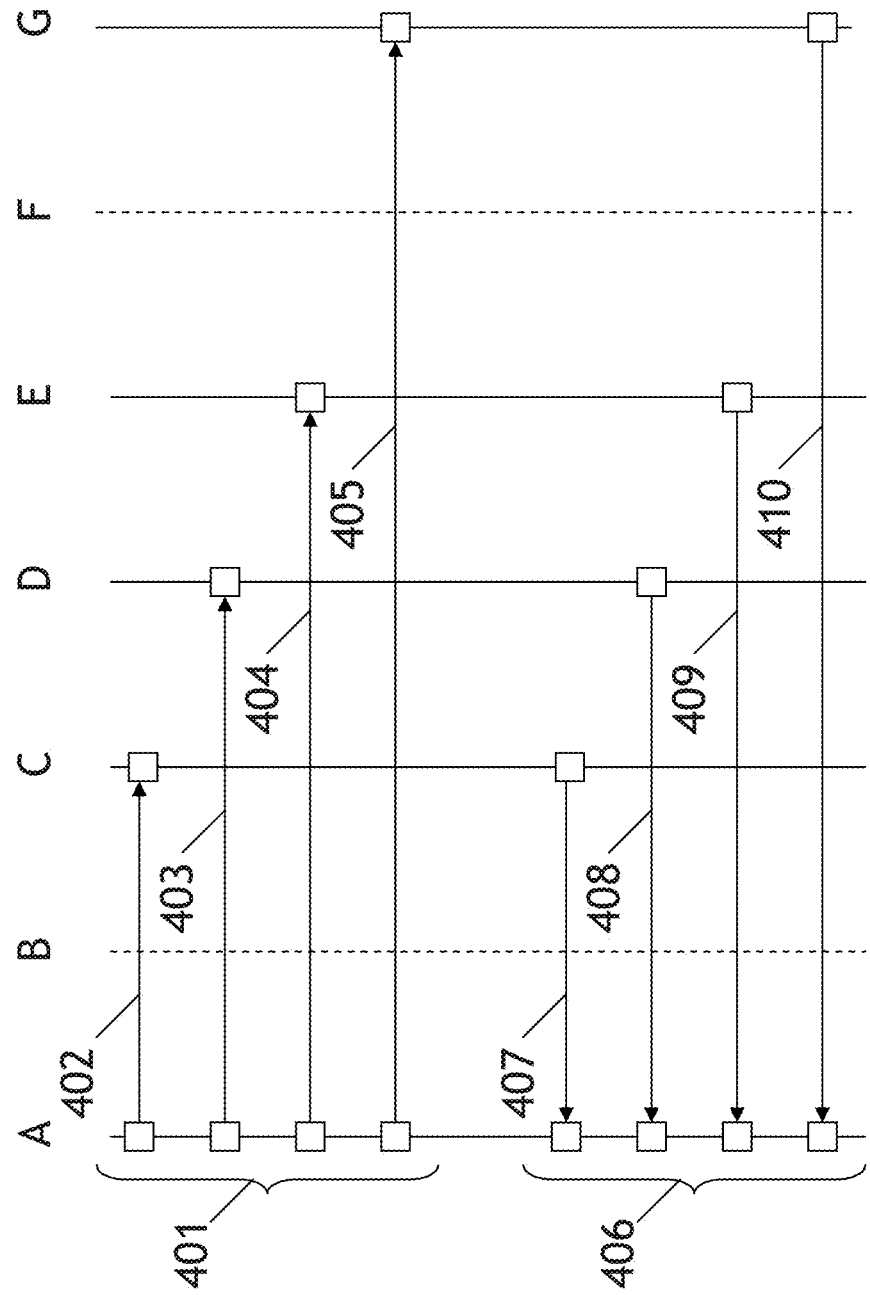
FIG. 4 is a schematic depiction of a centralized propagation of signaling messages.

As stated previously, many signaling protocols other than RSVP-TE may be used to exchange signaling messages between the controllers of nodes A, C, D, E, and G. With reference to FIG. 4, we have schematically depicted a centralized signaling protocol in which the controller 22 of the node A transmits, as numbered 401, messages 402, 403, 404 and 405 of an ACDEG connection request. These messages are respectively received by controllers 22 of the nodes C, D, E, and G. The node A receives, as numbered 406, messages 407, 408, 409, and 410 accepting the acknowledgement of the ACDEG connection request. These messages are respectively transmitted by the controllers 22 of nodes C, D, E, and G. In such a centralized signaling protocol, nodes C, D, E, and G do not necessarily exchange signaling messages with one another.

Hereafter and for simplicity's sake, it will be assumed that the signaling messages are RSVP-TE messages as schematically described in relationship with FIG. 3.

For the purpose of establishing an ACDEG connection, the RSVP-TE PATH control signaling message numbered as 302 received by the node C comprises the control information enabling the controller 22 of the node C to configure the corresponding switch 21 so as to establish portion ACD of the connection's path. The controller of node C orders the corresponding switch 22 to configure itself appropriately. The controller of node C is also capable of estimating the switch duration that the corresponding switch 22 will need to achieve the desired configuration. Here, the "switching end date" of a transport switch refers to the date when that element reached a state enabling it to participate in the creation of the desired ACDEG connection.

This duration may vary depending on the type of ACDEG connection to establish and according to the network's load. This duration may therefore vary from one day to another, or within a single day. It is therefore difficult in general to predict the switching duration that will be necessary for each of the switches 21 of the path ACDEG to establish the corresponding connection.

The controller 22 of the node C then transfers the RSVP-TE PATH connection establishment request message numbered as 303 to node D. In this message, it is requested of node D's controller to configure the switch of node D so as to establish portion CDE of the connection. Furthermore, node C included in the message 303, information making it possible to estimate the switch's end of switching located in node C.

Information making it possible to estimate a node's switch's end-of-switching may be of various natures. It may, for example, be the switching end date, or a switching start date associated with a switching duration. Various methods may be used to determine the switching end date of a switch. These methods may, for example, be electrical, optical, or mechanical. The methods may be direct, by verifying the actual establishment of the transport connection by the switch, or indirect, by observing an indicator, for example an electronic or software indicator, representing the configuration. The accuracy of the knowledge of the switching end date may itself be adapted to the application. In order to take this accuracy into account, the controller of node A, which is tasked with confirming the establishment of the ACDEG connection, may use the necessary time safety margins.

The controller 22 of the node D indicates in the RSVP-TE PATH messages numbered 304 an indicator of the switching end date of the corresponding switch, Furthermore, the controller 22 of node D also indicates in the message 304 the switching end date indicator of the switch of node C, which it received by message 303. The controller 22 of node E sends to node G the RSVP-TE PATH message numbered 305. This message gives indications about the switching end dates of the switches of nodes C, D, and G. Node G indicates in the message RSVP-TE RESV 310 the indicators of switching end dates of the switches of nodes C, D, E received with the numbered message and a switching end date indicator of the switch located in node G. This information is respectively transferred to the controller of node A by the messages RSVP-TE RESV numbered 309, 308, and 307, transmitted successively by the controllers of nodes E, D, and C.

The controller 22 of node A knows the switching end date of the switch 22 of node A. The controller 22 of node A is therefore capable of comparing the switching end indications of the switches of nodes A, C, D, E, and G and to deduce from them the latest switching end date. This latest switching end date, potentially increased by a time margin, is assumed by the controller of the node A to be the full establishment date of the ACDEG connection.

In one possible variant, the switching end indications of nodes E, D and C are indicated for the first time in the RSVP-TE RESV messages numbered 309, 308, and 307, respectively. In this variant, the dates are not indicated in messages 305, 304, and 303, respectively.

In another variant regarding the signaling method described in relationship with FIG. 4, the estimates of the switching end dates of the switches of nodes C, D, E, and G may respectively be indicated in messages 407, 408, 409, and 410.

Figure 5:
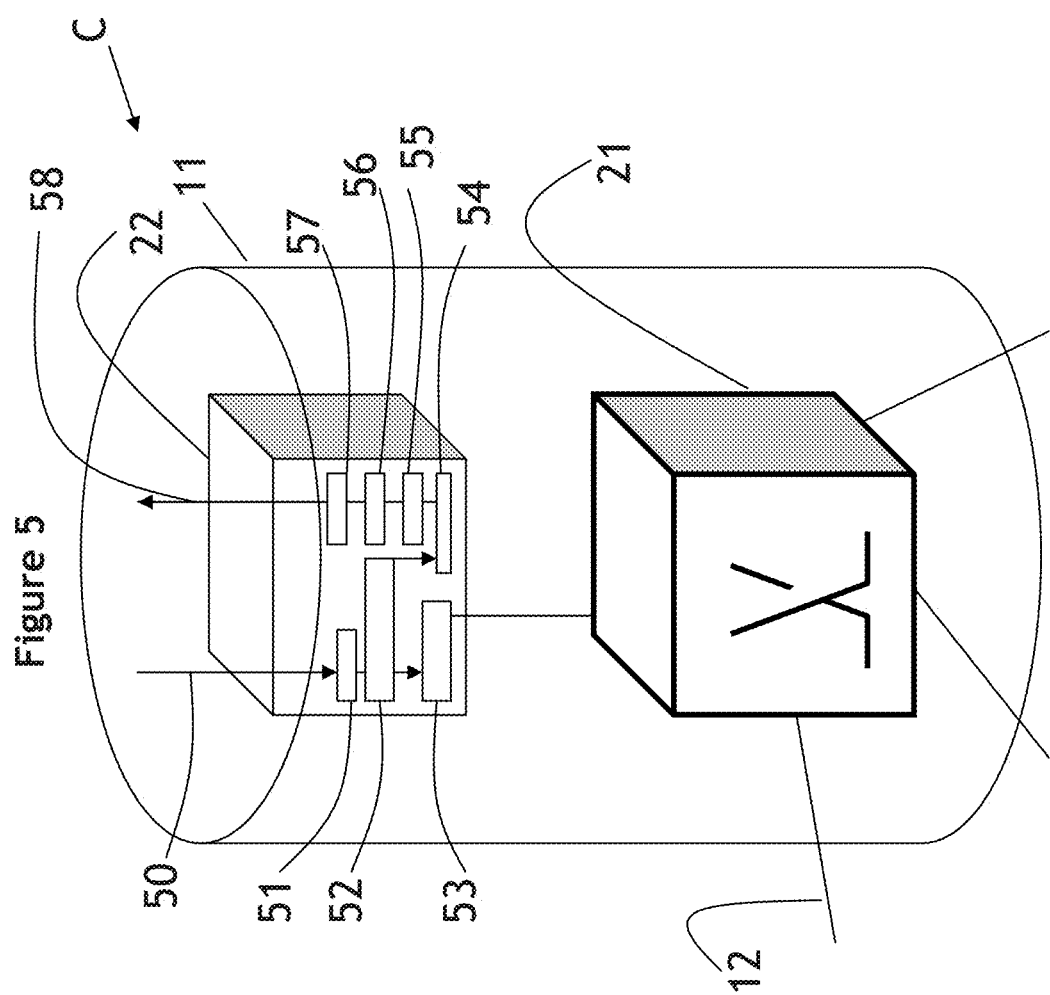
FIG. 5 is a more detailed view of a node of FIGS. 1 and 2.

In relationship with FIG. 5, node C and paths 12 of the network have been depicted. A switch 21 and a controller 22 have also been depicted. The controller 22 receives signaling messages 50 from the cloud 24 (FIG. 2) and transmits signaling messages 58 to the cloud 24. The message 50 is a RSVP-TE PATH message including an ACDEG connection establishment request indication. It is received by the reception module 51. This message is communicated by the module 51 to the calculation module 52 which calculates an adapted configuration of the switch 21. The calculation module 52 communicates this adapted configuration to the order module 53 which orders the switch 21 to configure itself in relationship with the request of the ACDEG connection. The adapted configuration of the switch 21 is also communicated by the module 52 to the estimation module 54, which calculates a switching end indication of the switch 21, for example by taking into account the initial configuration and the configuration of the switch 21 of node C, suitable for establishing the ACDEG connection. The module 55 generates a RSVP-TE PATH message. The module 56 records in this message an indication of the switching time of the switch 21, as calculated by the estimation module 54. The module 57 transmits the RSVP-TE PATH signaling message numbered 58.

Figure 6:
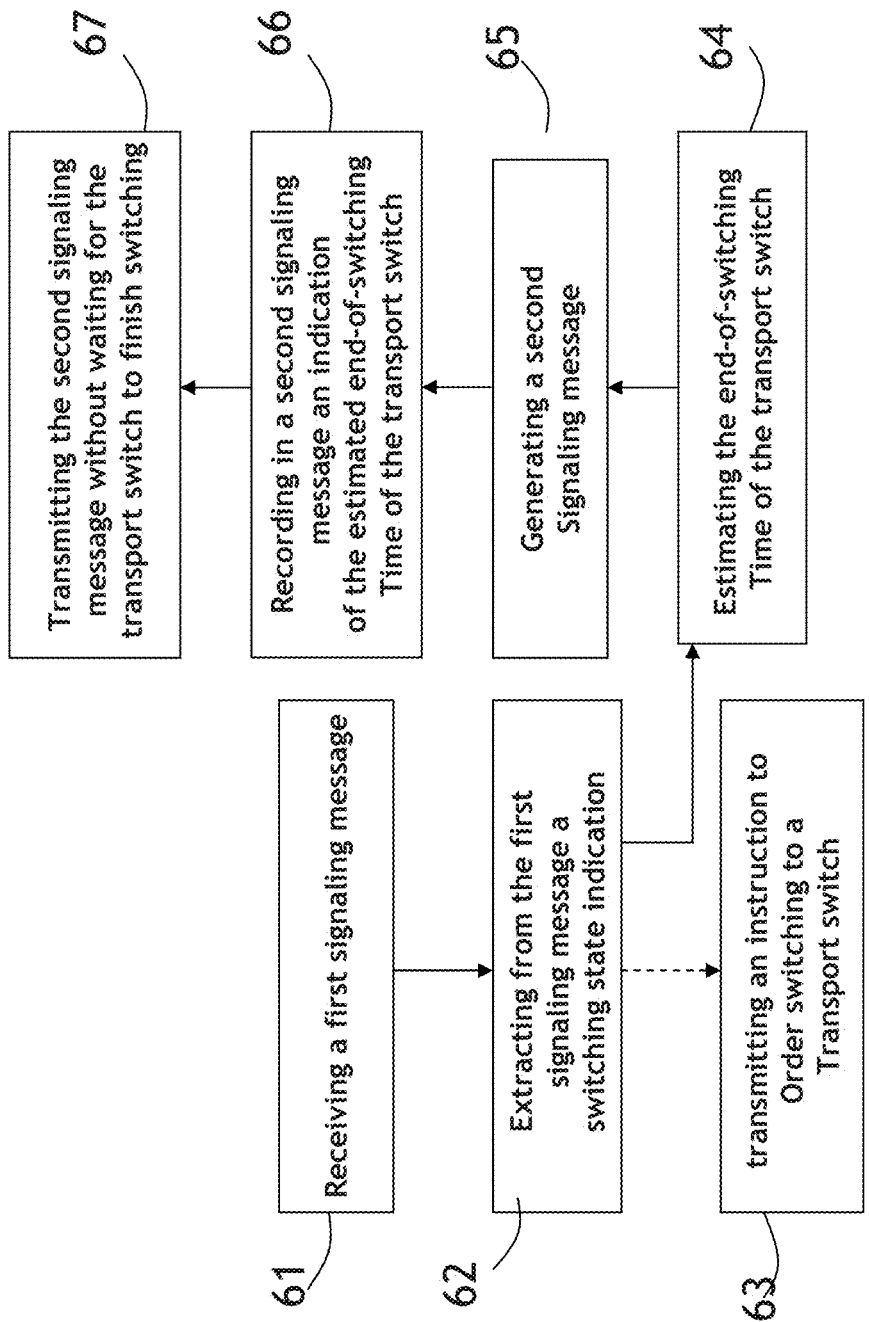
FIG. 6 is a diagram of steps describing one possible implementation of the signaling method.

FIG. 6 shows a method for transmitting an RSVP-TE PATH signaling message numbered 303 through node C. In step 61 a RSVP-TE PATH message numbered 302 including an ACDEG connection request is received by the controller 21 of node C. In step 62, an adapted configuration of the switch 21 is calculated. In step 63, the configuration is ordered to the corresponding switch 21. In step 64 a switching end indication of the switch 21 is estimated. In step 65 a RSVP-TE PATH message is constructed. In step 66 a switching time indication of the switch 21, as calculated in step 64, is recorded in the RSVP-TE PATH message numbered 303. In step 67, a RSVP-TE PATH signaling message numbered 58 is transmitted. FIG. 6 depicts the situation in which, in step 67, the signaling message numbered 58 is transmitted without waiting for the end of switching of node C's switch 21.

Figure 7:
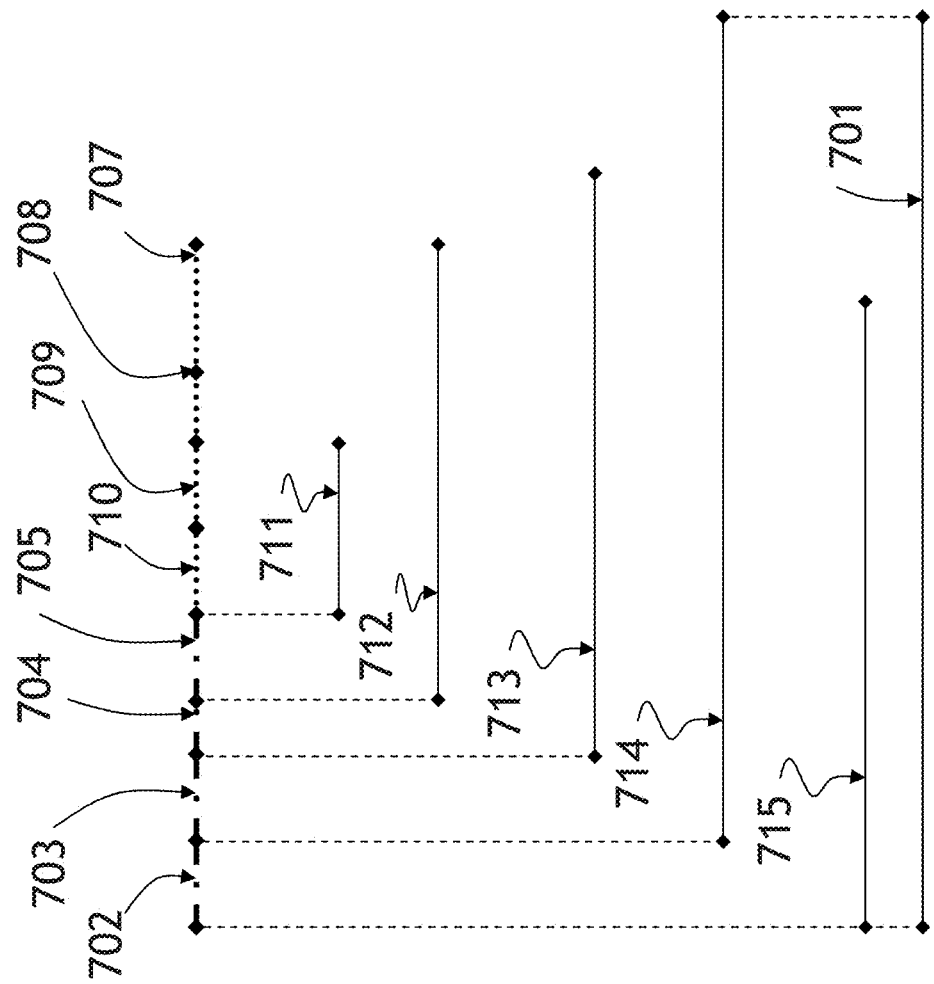
FIG. 7 is a time diagram describing a propagation and switching timeline regarding a connection's signaling.

FIG. 7 schematically depicts the propagation durations of the signaling messages and switches' switching durations. Numbers 702, 703, 704 and 705 represent the propagation durations corresponding to RSVP-TE PATH signaling messages numbered 302, 303, 304, and 305 respectively. Numbers 707, 708, 709 and 710 represent the propagation durations corresponding to RSVP-TE RESV signaling messages numbered 307, 308, 309, and 310 respectively. Numbers 711, 712, 713, 714, and 715 represent the switching durations of the respective switches of nodes G, E, D, C, and A.

A propagation duration may be made up of multiple time components. For example, the propagation duration of 702 may be made up of the sum of the following durations: the duration to build and transmit the RSVP-TE PATH message 302 by the controller 22 of node A, the propagation duration on the physical path linking the controller 22 of node A to the controller 22 of node C via the cloud 24, the duration to process the signaling message 302 by the controller 21 of node C, the duration taken by the controller of node 21 to build the order to configure the switch of node C.

A switch's switching duration may depend on many parameters, such as the switch's architecture, the physical effect used to create the switch, the electrical bandwidth of the electrical circuits supplying the switch, the performance of the functions of the components of the switching matrix, etc. For example, switching times of several milliseconds are expected by MEMS (Microelectromechanical Systems) spatial switches. Switching times on the order of 500 picoseconds are expected from wavelength channel switches using optical GaInAsP/InP semi-conductor amplifiers. Other switching times are possible, particularly for electronic switches. The switching duration times indicated are those of the elementary 1×2 switches that may serve to form a larger N×P switch. Depending on the node's system architectures, the total switching duration of an N×P switch larger than 1×2 may be significantly longer than the switching duration of a 1×2 switch, for example by several minutes. This duration may also depend on the measurement accuracy if the end-of-switching observation depends on a measurement; a measurement may, for example, be obtained from a calculation or an observation of the switch's time performance/

In FIG. 7, the continuous depiction of durations 702, 703, 704, 705, 710, 709, 708, and 707, illustrates the situation indicated in relationship with step 67 of FIG. 6 in which the respective PATH 302, 303, 304, 305, and RESV 310, 309, 308 and 307 signaling messages are transmitted without waiting for the end-of-switching of the corresponding switches 21.

In FIG. 7, a node's switch 21 begins switching at the end of the duration of processing 62 the RSVP-TE PATH message received by that node's controller 21. These switching durations are available together for the controller 21 of node A at the time when the RSVP-TE PATH message numbered 307 is read by the controller 21 of node A.

In the example depicted in FIG. 7, the arrival date of the message numbered 307 is the sum of durations 702, 703, 704, 705, 710, 709, 708, and 707. On that date, the switch 21 of node A may calculate that the switch of node G with switching duration 711 has already switched, that the switch of node A with switching duration 715 has also switched, and that the switch 21 of node E with switching duration 712 has just finished switching. On that same date, the switches of nodes D and C, with respective switching durations 713 and 714, have not finished switching. The controller 21 of node A is therefore capable of calculating that the earliest date for confirming the configuration of the establishment of the ACDEG connection is the connection end date of switch 21 of node C. This earliest date is depicted by the end of the segments numbered 701 in FIG. 7. It corresponds to the end of the segment numbered 713 corresponding to the end-of-switching of the switch of node C.

Figure 8:
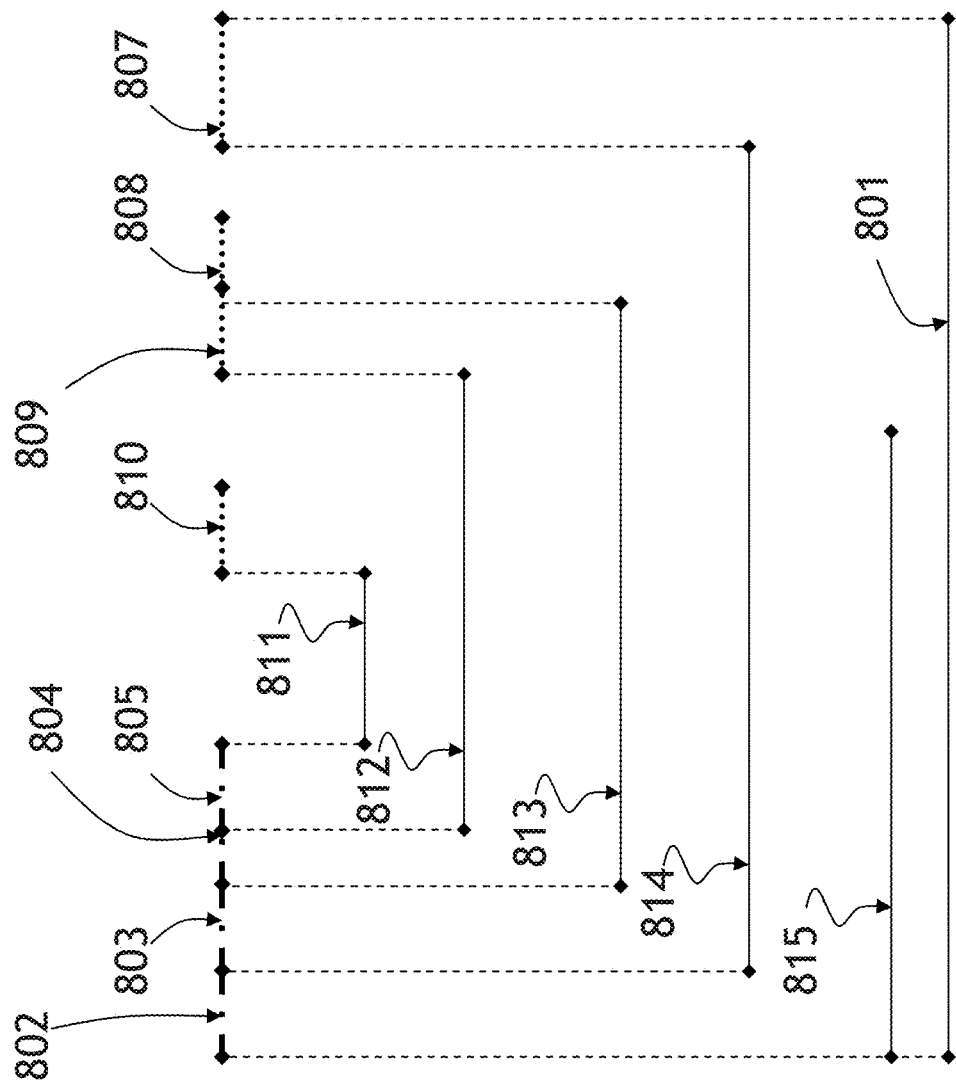
FIG. 8 is another time diagram describing a propagation and switching timeline regarding a connection's signaling.

FIG. 8 depicts propagation durations and switching durations corresponding to a protocol for which the RSVP-TE RESV messages are only transmitted by the controller of a first node to the controller of an adjacent second node after the switch of said first node has finished switching. This approach is therefore different from the one described by step 67 of FIG. 6, in which the signaling messages are sent by a node controller without waiting for the corresponding switch's end-of-switching. In FIG. 8, the nodes' switches are starting to switch at the end of the propagation duration of an RSVP-TE PATH message to that node. Numbers 802, 803, 804, and 805 depict the propagation durations of the RSVP-TE PATH messages, and those numbered 810, 809, 808, and 807 represent the propagation durations of the RSVP-TE RESV messages. As indicated in FIG. 8, the start of the duration 810 coincides with the end of the duration 811. This means that the RSVP-TE RESV message is sent by the controller of node G to the controller of node E at the time when the switch of node G has finished switching. This is represented by a duration start date 810 which is not continuous with the duration end date 805, particularly because of the wait time for completing the switching of node G. The same holds true for the RSVP-TE RESV message numbered 809 that is transmitted by the controller of node E at the end-of-switching of the switch of node E. The same also holds true for the RSVP-TE RESV message numbered 807 which is transmitted by the node C after the end-of-switching of the switch of node C. Conversely, in FIG. 8, the propagation durations 809 and 808 are continuous, because on the duration's end date 809, which is the arrival date of the RSVP-TE RESV message received by the controller of node D, that node's switch, whose switching duration is 813, has already finished switching. The earliest date when the controller of node A is ensured of the end-of-switching of all switches of the nodes in the ACDEG connection corresponds to the end of the segment 801 in FIG. 8, meaning the date when the controller of node A receives the RSVP-TE RESV message numbered 807. The earliest confirmation date of the ACDEG connection by the controller of node A corresponds to the end of the duration 801 in FIG. 8.

Comparing FIGS. 7 and 8 indicates that the duration 801 for establishing the ACDEG connection is greater than the duration 701, due to the presence of time discontinuities between durations 805 and 806, 806 and 807, and 808 and 809. The sending of RSVP-TE PATH messages by the controllers of nodes 21, as indicated in step 67 of FIG. 6 explains why the duration 701 is shorter than the duration 801. The sending of an RSVP-TE-type message by the controllers of nodes 21 without waiting for the end-of-switching of the corresponding switches therefore makes it possible to reduce the overall time to establish the ACDEG connection compared with an RSVP-TE-type protocol in which the controllers of nodes 21 send RSVP-TE messages only after the end-of-switching of the corresponding switches.

The given embodiments may, for example, apply to a wavelength division multiplexed (WDM) optical communication network. Other embodiments may also use single-wavelength optical networks or coherent optical networks. Other embodiments may use electronic-switching networks, for example an Ethernet switch or IP switch. The modes of the network may have a tree, ring, or bus topology, or other transport network topologies.

Although the invention has been described in connection with multiple specific embodiments, it is naturally not in any way limited to them, and comprises all technical equivalents of the means described, as well as their combinations, if said combinations fall within the scope of the invention.

The use of the verb "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple controllers or modules may be depicted by a single hardware element.

In the claims, any reference sign within parentheses should not be interpreted as limiting the claim.

The invention claimed is:

1. A method for controlling the establishment of a connection within a transport network, said method comprising,
    receiving (61) within a first node of said network located on a path of said connection, a first signaling message for establishing said connection for the transport of a signal within said transport network,
    processing (62) said first signaling message to extract from it the information needed to identify a switching state for a transport switch of said first node,
    ordering (63) said transport switch to configure said transport switch in said switching state (65),
    estimating (64) a first piece of time information comprising an earliest configuration end date of said transport switch,
    generating a second signaling message,
    said second signaling message comprising said first time information for enabling a second node of the network to determine the configuration end date of said transport switch, and
    transmitting (67) said second signaling message to said second node of said transport network, so as to reduce an overall time to establish the connection.

2. A method according to claim 1, wherein said transport switch may use a layer-1 or layer-2 or layer-3 switching technology.

3. A method according to claim 1, wherein said second network node is a node adjacent to said first node on the path of said connection or an end node along the path of said connection or a network management element.

4. A method according to claim 1 wherein said first signaling message further contains a second piece of time information enabling a controller of the first node to determine a configuration end date of a transport switch located within a third node located along the path of said connection.

5. A method according to claim 4 characterized in that said second signaling message is generated so as to comprise said second time information.

6. A method according to claim 4 characterized by the step of comparing said first and second time information and to insert into said second signaling message, instead of the first time information, whichever of said first and second time information corresponds to whichever of said switches which has the latest switching end date.

7. A method according to claim 1, wherein said signaling messages are RSVP-TE-type messages.

8. A controller for a node of a communication network located along the path of a connection, said controller being capable of,
    receiving (61) within a first node of said network located on a path of said connection, a first signaling message for establishing said connection for the transport of a signal within said transport network,
    processing (62) said first signaling message to extract from it the information needed to identify a switching state for a transport switch of said first node,
    ordering (63) said transport switch to configure said transport switch in said switching state (65),
    estimating (64) a first piece of time information comprising an earliest configuration end date of said transport switch,
    generating a second signaling message,
    said second signaling message comprising said first time information for enabling a second node of the network to determine the configuration end date of said transport switch, and
    transmitting (67) said second signaling message to said second node of said transport network, so as to reduce an overall time to establish the connection.

9. A controller according to claim 8, wherein said transport switch may use a layer-1 or layer-2 or layer-3 switching technology.

10. A controller according to claim 8, such that said first time information comprises said configuration end date of said transport network's switch.

11. A controller according to claim 8, such that said controller is capable of transmitting said second message without waiting for the end of said transport switch's switching.

12. A controller according to claim 8 capable of determining a configuration end date of a second transport switch located within another node located on the path of said connection, based on said second time information contained within said first signaling message.

13. A controller according to claim 12, characterized in that it is capable of generating said second signaling message such that it also comprises said second time information.

14. A controller according to claim 12, characterized in that it is capable of comparing said first and second time information, and that it is capable of inserting into said second signaling message, instead of the first time information, whichever of said first and second time information corresponds to whichever of said switches which has the latest switching end date.

15. A controller for a node according to claim 8 such that said signaling messages are RSVP-TE-type messages.

* * * * *